United States Patent [19]

Zufang et al.

[11] Patent Number: 4,609,423

[45] Date of Patent: Sep. 2, 1986

[54] APPARATUS FOR MAKING A WEB OF PLASTIC MATERIAL

[75] Inventors: Arthur A. Zufang, St. Anthonis; Robert A. M. J. Fabrie, 's-Hertogenbosch, both of Netherlands

[73] Assignee: Stork Brabant BV, Netherlands

[21] Appl. No.: 549,970

[22] Filed: Nov. 8, 1983

[51] Int. Cl.$^4$ ................................................ B31F 5/00
[52] U.S. Cl. .................................. 156/555; 156/583.1
[58] Field of Search ............. 156/85, 164, 229, 308.2, 156/311, 324, 209, 459, 148, 555, 583.1; 264/258

[56] References Cited

U.S. PATENT DOCUMENTS 2,434,541  1/1948  Bierer .................................. 156/311

FOREIGN PATENT DOCUMENTS 2447808  8/1980  France .
846646  8/1960  United Kingdom .
2049540  12/1980  United Kingdom .

Primary Examiner—James J. Bell
Attorney, Agent, or Firm—Ostrolenk, Faber, Gerb & Soffen

[57] ABSTRACT

A web of plastic material presenting filtering properties comprises a porous layer interconnected with a first non woven layer of plastic fibers.

The porous layer is formed by heating another nonwoven of plastic fibers, having a lower plasticizing temperature than the fibers of the first non woven, to at least the plasticizing temperature of the fibers of the other non woven but below the plasticizing temperature of the fibers of the first non woven.

The first nonwoven consists of polyester fibers and the other nonwoven, e.g., of polypropylene fibers.

An apparatus for manufacturing such a web comprises a central roller, and endless felt band partially slung around said central roller, a heating member and a cooling element.

In one embodiment the apparatus comprises a heatable central roller, a second endless metal band engaging a coolable second roller, said heatable central roller and an endless felt band partially surrounding the heatable central roller and a part of the metal band engaging said heatable central roller, non-woven material being passed between said endless metal band and said felt band (FIG. 2).

In another embodiment the central roller is a coolable central roller, heating means being accommodated opposite a region of the central roller and a part of the metal band engaging said part of the central roller. The felt band engages the central roller before and after the region opposite the heating means (FIG. 3).

5 Claims, 4 Drawing Figures

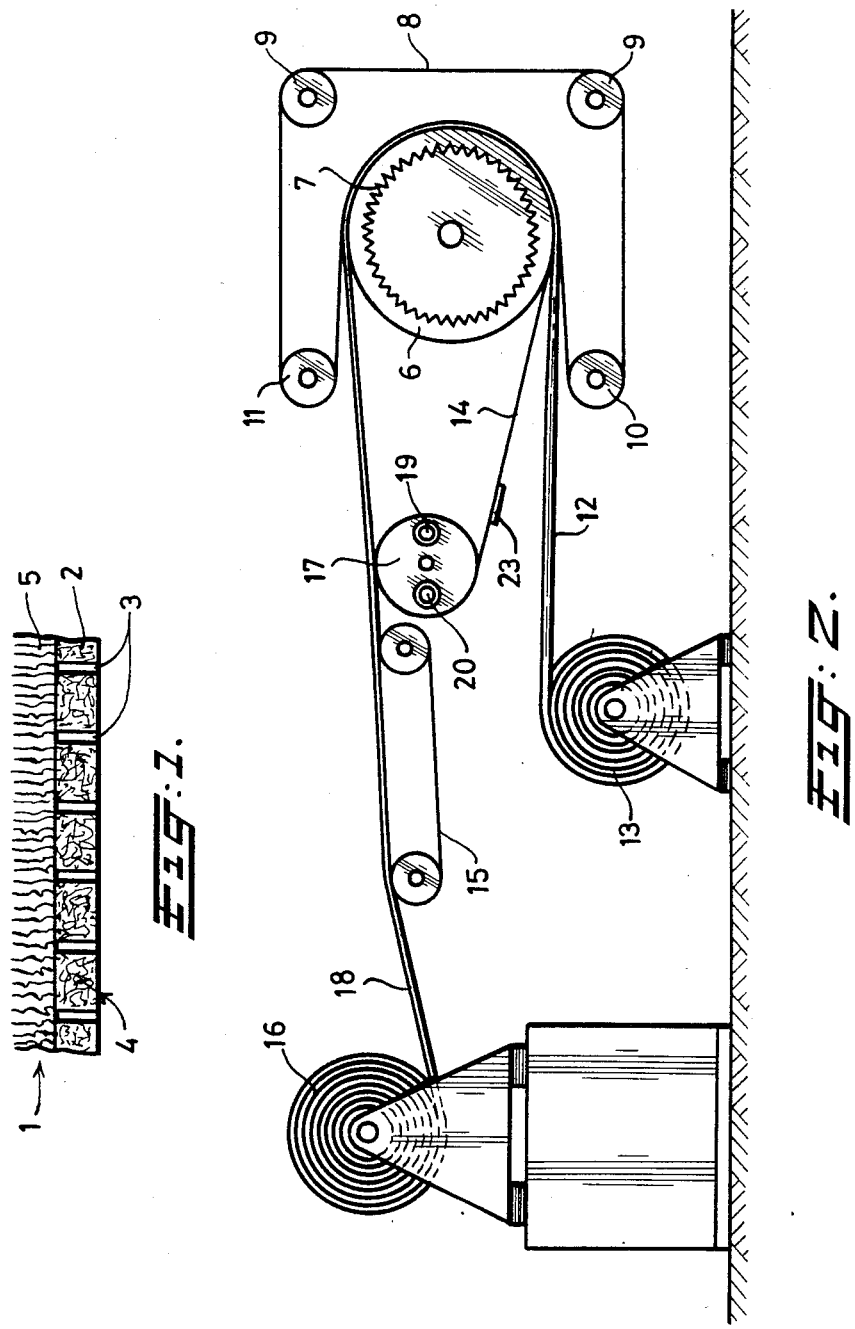

APPARATUS FOR MAKING A WEB OF PLASTIC MATERIAL

BACKGROUND OF THE INVENTION

1. Field of the Invention

This invention relates to a web of plastic material, more particularly a web of plastic material presenting filtering properties obtained by heat treatment while retaining the base material in such a manner that the base material has undergone a controlled stretch or shrinkage.

2. Description of the Prior Art

Such a web of plastic material as obtained by retaining, for example, a polyester or nonwoven sheet material in a tenter, and heating same, for example, up to 200° C., is known in the art.

This heating process provides stability to the material so that it can be used at a working temperature of up to 200° C. without drastic changes in shape or appearance occurring.

A web of plastic material of this type is relatively expensive, since the base material has to be clamped in a tenter, while heating up to the predetermined temperature also requires very accurate processing conditions.

On the other hand, there is also known a web-shaped plastic nonwoven material obtained by impregnating a plastic nonwoven with plastic resin, and subsequently curing the plastic resin by heat, said treatment being carried out on a roller calender. A drawback of this known web-shaped plastic nonwoven is that the heat treatment must take place within a short time and with high line pressure between the rollers of the roller calender and the base material.

Finally, when subjecting a web-shaped plastic material composed of a laminate of two nonwovens of different plastic materials, the disadvantage arises that, when heating the plastic fibers having the lowest melting point up to the melting temperature, said plastic fibers will fuse together and form a very small mass, all favorable properties of the web-shaped plastic material thus getting lost.

SUMMARY OF THE INVENTION

It is therefore a main object of the present invention to provide a web-shaped plastic material which is easier to manufacture and, in addition, has optimum strength properties, without the necessity of using a tenter or roller calender.

This object is attained according to the invention in that the web of plastic material has been formed by passing the base material through a region formed by a roller and an endless band at least partially slung around said roller, while heat is supplied.

When applying these measures, which can be carried out effectively by using a band calender, it is possible to accurately control the degree of pressure between the band and the roller, and, in addition, to work with relatively low pressure forces, enabling the contact times to be long in comparison with contact times and pressure forces in a roller calender, which results in optimum quality of the final product.

Advantageously, the web of plastic material consists of a first nonwoven layer of plastic fibers having a higher plasticizing point than another plastic layer bonded to said nonwoven layer.

Such a web of plastic material is suitable for a wide range of applications, and, in case the other plastic layer is a porous plastic layer, the web of plastic material is particularly well adapted for use as a filtering material.

Especially good filtering materials are obtained when one surface of the other porous plastic layer is free from plastic fibers projecting from the first nonwoven layer, and has been obtained by fusing together plastic fibers of an other nonwoven layer.

Particularly such a web of plastic material is suitable for filtering compositions of liquid foodstuffs, such as milk, but also for many other types of filtration, as the first nonwoven layer retains its normal properties and, the other plastic layer on the other hand, is provided with specified pores to allow liquid passage.

The web-shaped plastic material according to the present invention particularly possesses very well controlled stretch or shrinkage properties, as a result of which it can be used in an optimum manner as an industrial product so as to manufacture other products.

The invention also relates to a method of manufacturing a web of plastic material, more particularly a web of plastic material with filtering properties, by subjecting a web-shaped base material to heat treatment while retaining said base material in such a manner, that said material is subjected to a controlled stretch or shrinkage, the base material passing through a region located between a roller and an endless band at least partially slung around said roller, while heat is supplied.

This method provides a web of plastic material having optimum properties as compared with products manufactured so far on tenters or by means of roller calenders.

Advantageously, the surface pressure during treatment is comprised between 0.05 and 3 kg/cm$^2$, preferably 0.10 and 0.15 kg/cm$^2$, the temperature being comprised between 25° and 300° C. at a contact time between 1 and 60 sec, preferably 5 and 15 sec.

The method according to the invention moreover provides particularly great advantages in the event that heat treatment is carried out in several regions located at or in the vicinity of the circumference of a central roller, to wit subsequently a preheating region, a constant-temperature region and a cooling region, preferably around a central roller, which affords optimum properties to be obtained. In this way a web of excellent quality is obtained.

Effectively, a layer of a release agent is applied upon the base product, upon the central roller and/or upon one or several of the bands at least partially slung around the roller and engaging the plastic material, so as to enable easy removal of the finished product, if the product, in the absence of a release agent, would adhere to the surface areas of the roller and/or one several bands being at least partially slung around the roller.

Effectively, the release agent is applied by means of a traversely moving felt strip.

The present invention is further embodied in apparatus for performing the method of the invention, consisting of a central roller which co-operates with an endless band being at least partially, slung around the circumference of the central roller, as well as a guide means provided for the endless band and a tensioning means for pressing the band against the roller surface with controllable force, said apparatus being provided with at least one heat-supply member and at least one cooling member.

In a favorable embodiment of the apparatus according to the invention the first endless band consists of a heat-conducting material and at least one heat-supply member is disposed along a portion of the circumference of the central coolable roller covered by the first band which has been partially slung around the central roller. This allows a very high production speed as the coolable roller will rapidly cool the band of heat conducting material so that the plastic material after heating will easily loosen from said band.

According to another advantageous embodiment of the present invention at least two bands are slung around a central heatable roller, one of the bands being a band having a low heat resistance and being disposed between the central heatable roller and a heat-insulating, second endless band being said first band, said band with low heat resistance being passed through a cooling region located outside the circumference of the central roller. Due to the presence of the band of a low heat resistance the heat treated web will easily loosen from said band after cooling whilst on the other hand this band will not impair the effectivity of the heat treatment.

The features of the present invention which are believed to be novel are set forth with particularity in the appended claims.

Other clains and many of the attendant advantages will be more readily appreciated as the same becomes better understood by reference to the following detailed description and considered in connection with the accompanying drawings in which like reference symbols designate like parts throughout the figures.

SURVEY OF THE DRAWINGS

FIG. 1 is a cross-sectional view of a web of plastic material according to the present invention;

FIG. 2 is a first embodiment of an apparatus according to the invention;

DESCRIPTION OF THE PREFERRED EMBODIMENTS

Figure 3:
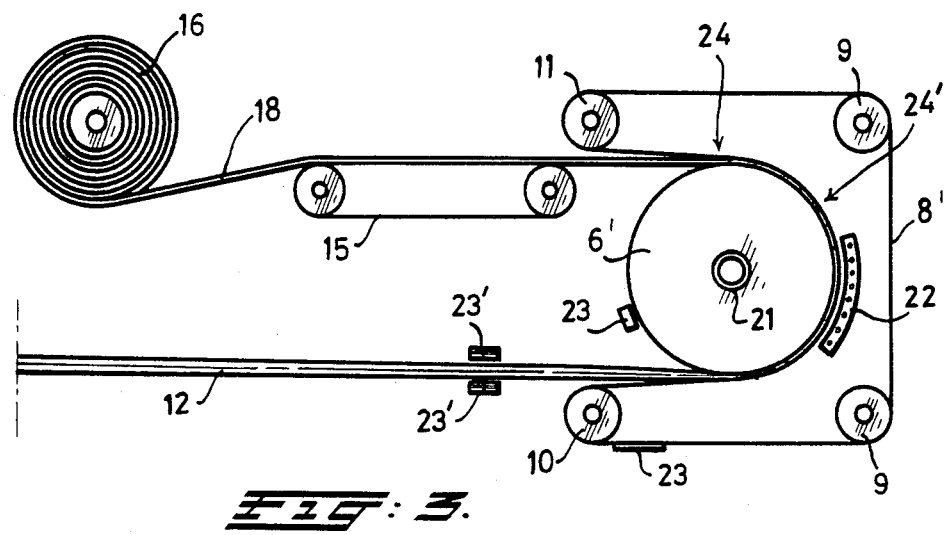
FIG. 3 is a second embodiment of an apparatus according to the invention.

Referring now to FIG. 1 a web of plastic material according to the invention is illustrated comprising a first polyester nonwoven 1 adhesively bounded with another plastic layer 2 obtained by fusing polyolefin fibers, more particularly polypropylene fibers. Said other plastic layer 2 is fused in such a way that the layer is provided with pores 3.

As can be seen, the other plastic layer in the form of porous polypropylene sheet material 2 is, on one surface, adhesively bonded with the first polyester nonwoven fabric whose fibers are secured in the polypropylene sheet material 2. The other surface 4 of the web-shaped plastic material is free from projecting fibers.

A material of this type lends itself particularly well to being used as a filtering material for milk, but also for other filtration processes.

FIG. 2 illustrates an apparatus according to the present invention comprising a central roller 6 provided with heating coils 7 and/or a supply and discharge means for a heating fluid to bring this central roller to a predetermined temperature.

An endless felt band 8 is partially slung around the circumference of the central roller 6 and passes over guide rollers 9 and tensioning rollers 10 and 11 to press the felt band 8 against the central roller 6 with the desired force, thus enabling the pressure desired to be exerted upon a web-shaped laminate 12 of a nonwoven material of polyolefin fibers, particularly polypropylene fibers, which have been consolidated with a first nonwoven of polyester fibers by needle-punching.

Said laminated composite nonwoven 12 is fed from a reel 13 or other feed mechanism of base material.

Co-operating with the outer surface of the central roller 6 there is a second endless band or follower 14 having a low heat resistance, such as for example, a metal foil provided with a thin layer of polyester or a thin band of glass-fiber teflon. This second band 14 passes via a coolable roller 17, past which there is disposed a conveyor belt 15, for guiding the web of plastic material (referenced 18) and obtained according to the invention, to a coiling reel 16 or other type of coiling mechanism.

In using a composite nonwoven of polypropylene fibers and a non woven layer of polyester consolidated therewith by needling, the temperature of the central roller 6 may be approximately 180° C., the contact time in the heating zone then being 10 sec.

In the path where the web-shaped plastic material formed according to the invention leaves the surface of the central roller 6, the finished product is cooled, the coolable roller 17 cooling it ultimately to a temperature below 100° C., for example 60° C. To this effect, the cooled roller 17 is fed with cooling water of for example 20° C. by way of the cooling-water feed means 19 and cooling-water outlet means 20.

In general, the surface pressure between the felt band 8 and the second or follower band 14 is chosen so as to be comprised between 0.5 and 3 kg/cm2, and preferably between 0.10 and 0.15 kg/cm2. The temperature is preferably comprised between 25° and 300° C. at a total contact time of 1 to 60 sec, preferably 5 to 15 sec, between the follower band 14 and felt band 8.

FIG. 3 still illustrates another embodiment of the invention comprising a cooled central roller 6' provided with a central supply means 21 for supplying cooling water so that the circumferential surface of the central roller 6' is cooled to, for example, room temperature.

The web of composite nonwoven 12 likewise supplied from a supply reel 13 and composed of a nonwoven of polyester fibers and a nonwoven of polypropylene fibers consolidated with each other by needling, is pressed against the surface of the cooled central roller 6' by means of a first, endless band 8'. For supplying the heat required for the heat treatment, the apparatus is provided with a heating member 22 disposed opposite the circumferential surface of the central roller 6', but in such a manner that the heat is being supplied from the heating member 22 over part of the portion of the central roller 6', an endless band 8' being slung around this roller. Cooling of the heat-treated composite nonwoven web of the polypropylene having been fused to a porous layer, takes place after having passed the operative region of the heating member 22, thus in the area indicated by the arrows 24, 24'.

After leaving the central roller 6', the obtained porous polypropylene sheet material 2 along with the polyester nonwoven 5 adhesively bonded therewith, is passed to the coiling reel 16 through conveyor belt 15.

In order to prevent the composite nonwoven product 18 from adhering to the central roller 6' or to the heat-conducting, first endless band 8', it may be advisable to apply a release agent on said surfaces by means of a release-agent applicator means 23, for example in the form of a traversely moving felt strip.

It is of course also possible to apply the release agent directly upon the two surfaces of the base material by means of a release-agent applicator 23' (FIG. 3).

It is obviously also possible to apply the release agent upon the second endless band 14 and upon the felt band 8' by means of release-agent applicators 23.

Figure 4:
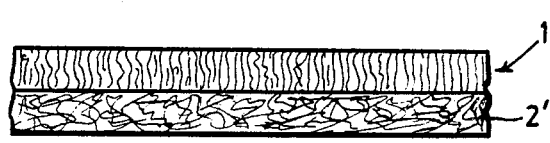
FIG. 4 is a schematic view of the base material.

FIG. 4 is a schematic view of the base product comprising a nonwoven 1 of polyester fibers and a nonwoven 2' of polypropylene fibers consolidated with each other by a needle-punching operation.

During the heat treatment in the apparatus (illustrated in FIG. 2), the polypropylene nonwoven 2' is guided in such a manner as to abut against the second endless band or follower band 14.

In the embodiment of the apparatus of FIG. 3, however, the polypropylene nonwoven 2' is guided so as to abut against the metal foil band 8' provided with a polyester layer.

The endless band 8' may, however, also consist of silicone paper or teflon foil material, the smoothness of the surface of the laminated polypropylene layer 2' obviously also depending upon the smoothness of said endless band 8'.

In the embodiment of FIG. 2, the central roller 6 has a surface temperature of at least 190° C.; in any event the temperature should be below 225° C., as, at the latter temperature, the polyester would melt.

In the foregoing, the application of a release agent by means of a traversely moving felt strip is described, but said release agent may obviously also be applied by spraying or by means of a roller applicator.

Survey of Examples

Example I

A band calender (see FIG. 3) is fed with a composite nonwoven layer consisting, for 20% of its weight, of a nonwoven layer of polypropylene and, for 80% of its weight, of a nonwoven layer of polyester, said two layers being consolidated with each other by needle-punching.

To obtain a filtering material in which the polypropylene is fused to a smooth porous layer and the polyester nonwoven adhering thereto as a voluminous filtering layer, the composite web of nonwovens is heated, by means of a heating element 22, to a temperature of 180° C. A heat-conducting band 8' of copper foil is used which, on its side being in contact with the nonwoven layer of polypropylene, is provided with a coating of polyester.

The contact time in the heating region, heated by the heating member 22, is 10 sec, whereas subsequent cooling to a temperature of 80° C. proceeds by means of the cooled central roller 6'. Hereupon the conveyor belt 18 carries the web-shaped material as obtained according to the invention to coiling reel 16.

The web of plastic material thus obtained and presenting excellent filtering properties consists of a polyester nonwoven whose polyester fibers are firmly secured in a polypropylene layer 2 provided with pores and formed by a fusing of the polypropylene fibers of the polypropylene nonwoven 2'.

The pore structure in the layer 2 is such that polyester fibers possibly becoming disengaged during the use of the web material according to the invention, are retained by the polypropylene filter material 2.

Example II

A web of composite nonwoven fabric is treated as described in example I in a felt-band calender (see FIG. 2). The central roller 6 has a surface temperature of 190° C.

The copper-foil band 14 having low heat resistance then melts the fibers of polypropylene to a porous layer and conveys the sheet material 18 as obtained to the cooling roller 17 where the copper foil band 14 is cooled by water. Due to the cooling the copper will contract and thus the composite web material having a temperature of 80° C. is separated from the copper band 14. Subsequently, the web of plastic material according to the invention, presenting excellent filtering properties will be coiled.

Although the present invention has been shown and described in connection with some preferred embodiments thereof, it will be apparent to those skilled in the art that many variations and modifications may be made without departing from the invention in its broader aspects. It is therefore intended to have the appended claims cover all such variations and modifications as fall within the true spirit and scope of the invention.

What is claimed is:

1. An apparatus for manufacturing a web of plastic material, particularly a web of plastic material with filtering properties, by subjecting a web-shaped base material to heat treatment while retaining said base material in such a manner that said base material is subjected to a controlled stretch of shrinkage by mounting such base material in a pretensioned state, in which the base material passes through a region located between a roller and an endless band at least partially slung around said roller, while heat is supplied, and while the material is maintained in its original shape and appearance comprising a central roller cooperating with at least a first endless band which is, at least partially slung around the circumference of a central roller, as well as guide roller and pressure-adjusting roller for pressing the band(s) against the surface of the central roller with controllable force, said apparatus being provided with at least one heat-supply member and at least one cooling member, said pressure-adjusting roller engaging said band in a region where the band is not in engagement with said central roller.

2. An apparatus according to claim 1, wherein one endless band is present which consists of a heat-conducting material and which has been slung partially around the central roller, in which apparatus at least one heat-supply member is disposed outside the central roller and along the portion of the circumference of the central roller covered by the endless band, while the central roller is coolable (FIG. 3).

3. An apparatus according to claim 1 wherein at least two bands are slung aroung a central roller, while a heating element is disposed inside said central roller, one band being said first endless band which is heat insulating and at least one of the other bands being a band having a low heat resistance and being disposed between the central roller and said first endless band, said band with low heat resistance being passed through a cooling region located outside the circumference of the central roller (FIG. 2), said cooling region being preferably a cooling roller.

4. A roller-band calendering apparatus for forming a composite web, said apparatus comprising a central roller, a means for feeding at least one web around said roller, a continuous band arranged for movement against said central roller; and pressure and guide rollers for guiding said band over a substantial preselected circumference of said central roller; means for guiding said web between said band and said roller to apply continuous smooth pressure against said web; said guide and pressure rolls for said band engaging said band at areas where said band is out of contact with said web to avoid deleterious line pressure on said band transverse of said web.

5. The roller-band calendering apparatus of claim 4, wherein heat is applied to said web at said central roller.

* * * * *